US010029677B2

(12) United States Patent
Owen et al.

(10) Patent No.: US 10,029,677 B2
(45) Date of Patent: Jul. 24, 2018

(54) VEHICLE CONTROL SYSTEM AND METHOD (71) Applicant: Jaguar Land Rover Limited, Whitley, Coventry, Warwickshire (GB)

(72) Inventors: Simon Owen, Brockhill (GB); Karl Richards, Leamington Spa (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 45 days.

(21) Appl. No.: 14/917,938

(22) PCT Filed: Aug. 19, 2014

(86) PCT No.: PCT/EP2014/067657
§ 371 (c)(1),
(2) Date: Mar. 9, 2016

(87) PCT Pub. No.: WO2015/032616
PCT Pub. Date: Mar. 12, 2015

(65) Prior Publication Data
US 2016/0214603 A1    Jul. 28, 2016

(30) Foreign Application Priority Data
Sep. 9, 2013    (GB) .................................. 1316035.3

(51) Int. Cl.
*B60W 30/02*    (2012.01)
(52) U.S. Cl.
CPC ......... *B60W 30/02* (2013.01); *B60W 2550/14* (2013.01); *B60W 2720/14* (2013.01); *B60W 2720/40* (2013.01); *B60W 2720/406* (2013.01)

(58) Field of Classification Search
None
See application file for complete search history.

(56) References Cited

U.S. PATENT DOCUMENTS

| | | | |
|---|---|---|---|
| 6,259,973 B1 | 7/2001 | Ehret et al. | |
| 6,266,599 B1 | 7/2001 | Van Zanten et al. | |
| 6,456,920 B1 | 9/2002 | Nishio et al. | |

(Continued)

FOREIGN PATENT DOCUMENTS

| | | |
|---|---|---|
| DE | 4334279 A1 | 4/1995 |
| DE | 19708508 A1 | 3/1998 |

(Continued)

OTHER PUBLICATIONS

Helmut Skalweit: "Der Schlepper beim Arbeiten am Hang", pp. 99-100 (not translated).

(Continued)

*Primary Examiner* — Mussa A Shaawat
*Assistant Examiner* — Abdhesh K Jha
(74) *Attorney, Agent, or Firm* — Reising Ethington P.C.

(57) ABSTRACT

Embodiments of the present invention provide a control system for a motor vehicle comprising: means for detecting a side-slope condition in which a vehicle is traversing a side-slope; and means for controlling an amount of torque applied to one or more wheels to induce a turning moment on a vehicle, the system being configured to cause a turning moment to be induced in a direction opposing side-slip of a trailing axle in a down-slope direction relative to a leading axle.

22 Claims, 5 Drawing Sheets (56) References Cited

U.S. PATENT DOCUMENTS

| | | | |
|---|---|---|---|
| 6,718,248 | B2 | 4/2004 | Lu et al. |
| 8,306,697 | B2 | 11/2012 | Lu et al. |
| 2003/0200016 | A1* | 10/2003 | Spillane .............. B60G 17/0195 701/36 |
| 2004/0193352 | A1 | 9/2004 | Ito et al. |
| 2005/0033486 | A1 | 2/2005 | Schmitt et al. |
| 2013/0013150 | A1* | 1/2013 | Jo ......................... B60W 30/18 701/41 |
| 2014/0039767 | A1 | 2/2014 | Jensen |

FOREIGN PATENT DOCUMENTS

| | | |
|---|---|---|
| GB | 2389828 A | 12/2003 |
| GB | 2441423 A | 3/2008 |
| JP | 2000501358 A | 2/2000 |
| JP | 2001122096 A | 5/2001 |
| JP | 2001138886 A | 5/2001 |
| JP | 2001153678 A | 6/2001 |
| JP | 2004299505 A | 10/2004 |
| JP | 2008290595 A | 12/2008 |
| JP | 2010025632 A | 2/2010 |
| JP | 2011000982 A | 1/2011 |
| WO | WO0220318 A1 | 3/2002 |

OTHER PUBLICATIONS

Hans Lange: "Die Seitenführungskrafir an Ackerluftreifenbeim Fahren quer zum Hang", Grundlagden der Landtechnik, pp. 109-112 (not translated).
ZF: "ZF Technik für mehr Sicherheit", Jul. 8, 2013, https://web.archive.org/web/20130708234415/http://www.zf.com/corporate/de/products/product_range/cars/safety_1/safety_3.html, 4 pages, (with English translation).
Combined Search and Examination Report corresponding to application No. GB1316035.3, dated Apr. 28, 2014, 8 pages.
International Search Report corresponding to International application No. PCT/EP2014/067657, dated Oct. 24, 2014, 7 pages.
Written Opinion corresponding to International application No. PCT/EP2014/067657, dated Oct. 24, 2014, 7 pages.
Japanese Office Action in Japanese with English summary, for JP application No. 2016-539461, dated Mar. 14, 2017, 7 pages.
Japanese Office Action in Japanese with English summary for JP application No. 2016-539461, dated Jan. 9, 2018, 6 pages.

* cited by examiner

| SP = Speed Proportional<br>TM = Towing Mode | | Motorway | Country Road | City Driving | Towing (on Road) | Dirt Track (Developing World Road) | Snow / Ice (Scandinavian / North America Conditions) | Grass/ gravel/ snow | Sand | Rock/ Crawl/ Boulder Crossing | Mud & ruts |
|---|---|---|---|---|---|---|---|---|---|---|---|
| Suspension Ride Height | High | | | | | | | | | X | |
| | Standard | | X | X | X | X | X | X | X | | X |
| | Low | X | | | | | | | | | |
| Side / Side Air Interconnection | Closed | X | X | X | X | X | X | | | | |
| | Open | | | | | | | X | X | X | X |
| Steering Assistance Level | High | SP | SP | SP | SP | SP | SP | SP | SP | | SP |
| | Low | | | | | | | | | X | |
| Brake Pedal Efforts | High | X | X | X | X | X | X | X | X | X | X |
| | Low | | (X) | X | X | | | | | X | |
| A.B.S. Mode | High mu | X | X | | | X | X | X | | | X |
| | Low mu | | | | | | | | X | | |
| | Plough Surface | | | | | | | | | | |
| E.T.C. Mode | High mu | X (2) | X | X | X | X | X | X | | X | X |
| | Low mu | | | | | | | | | X | |
| D.S.C. Mode | High mu | X | X | X | TM | X | X | X | X | X | X |
| | Low mu | | | | | | | | | | |
| Throttle Progression | Quick | | (X) | | (X) | | | | X | | |
| | Slow | X | X | X | X | X | X | X | X | X | X |
| Transfer Box | High Range | X | X | X | X | X | X | X | | | X |
| | Low Range | | | | | | | | X | X | |
| Auto Transmission | Normal Mode | X | | X | X | X | X | | X | | |
| | Performance Mode | | | | | | | | | | |
| | Snow Mode | | X | | | | | X | | | |
| | Sand Mode | | | | | | | | X | | |
| | Manual Mode | | (X) | | | | | | | X | X |
| Centre Diff Lock | Open | X | X | X | X | X | X | X | X | X | X |
| | Locked | | | | | | | | | | |
| Rear Diff Lock | Open | X | X | X | X | X | X | X | (X) | X | X |
| | Locked | | | | | | | | | X | X |

VEHICLE CONTROL SYSTEM AND METHOD

INCORPORATION BY REFERENCE

The entire contents of co-pending UK patent application numbers GB1111288.5, GB1211910.3 and GB1202427.9, UK patents GB2325716, GB2308415, GB2341430, GB2382158 and GB2381597, and US patent application US2003/0200016 are expressly incorporated herein by reference.

FIELD OF THE INVENTION

The present invention relates to a vehicle control system for one or more vehicle subsystems and to a method of controlling one or more vehicle subsystems.

BACKGROUND

It is known to provide a vehicle having a plurality of subsystems which can be operated in different configurations to suit different driving conditions. For example, automatic transmissions may be controlled in a variety of modes such as sport, manual, winter or economy. In each mode, subsystem control parameters such as accelerator pedal response and conditions under which changes between gear ratios take place may be modified so as to suit the conditions of the terrain or the particular taste of the driver. It is also known to provide air suspensions with on-road and off-road modes. Stability control systems can be operated at reduced activity in certain modes so as to give the driver more direct control, and power steering systems can be operated in different modes to provide a varying level of assistance depending on driving conditions.

It is desirable to provide an improved control system for a motor vehicle operable in different configurations.

STATEMENT OF THE INVENTION

Embodiments of the invention may be understood with reference to the appended claims.

Aspects of the present invention provide a control system, a vehicle and a method.

Control systems according to embodiments of the present invention are suitable for a range of different vehicles including conventional engine-only vehicles, electric vehicles, and/or hybrid electric vehicles.

According to an aspect of the invention for which protection is sought there is provided a control system for a motor vehicle comprising:

means for detecting a side-slope condition in which a vehicle is traversing a side-slope; and means for controlling an amount of torque applied to one or more wheels to induce a turning moment on a vehicle, the system being configured to cause a turning moment to be induced in a direction opposing side-slip of a trailing axle in a down-slope direction relative to a leading axle.

The turning moment may be induced in a direction opposite to a side-slope induced yaw direction when a side-slope condition is detected. Regardless of whether yaw has commenced, the turning moment may be applied so as to prevent or reduce yaw of the vehicle wherein a trailing axle suffers down-slope side-slip relative to a leading axle.

Some embodiments of the invention have the advantage that a control system may proactively cause a turning moment to be induced to counter yaw induced by a side-slope when a side-slope is detected. This has the advantage that an amount by which a trailing axle slip angle increases as the vehicle traverses the side-slope may be reduced. In some embodiments a trailing axle slip angle may be arranged to remain substantially zero during traversal of a side-slope by virtue of the turning moment induced by the system.

By trailing axle slip angle is meant an angle by which a trailing axle deviates from an orientation in which substantially zero side-slip is experienced by the trailing axle relative to a leading axle for a given vehicle track or path of travel over ground. The trailing axle slip angle may be considered to be the angle between a longitudinal axis of the vehicle and a direction of travel of the vehicle. If the vehicle is travelling in a direction normal to a direction of slope of the driving surface, traversing a side-slope along a line of substantially constant altitude or height above a reference height such as mean sea level, then the trailing axle slip angle may be considered to be the angle between the longitudinal axis of the vehicle and a direction normal to the direction of slope of the driving surface.

The control system may be configured to determine that a side-slope condition exists when a side-slope angle exceeds a prescribed angle.

In some embodiments, vehicle roll rate may be employed to derive vehicle roll angle and lateral acceleration to derive absolute vehicle angle by reference to vehicle geometry.

The control system may further comprise means for detecting a trailing axle slip angle Angle_TAS exceeding a threshold value Angle_TASt, the system being configured to cause a turning moment to be induced in dependence on detection of a trailing axle slip angle exceeding Angle_TASt, the turning moment being induced in a direction to reduce the trailing axle slip angle.

The control system may be configured to cause a turning moment to be induced having a magnitude determined in dependence on the value of Angle_TAS.

Optionally the control system is configured to cause a turning moment to be induced to reduce the value of trailing axle slip angle by causing application of brake torque and/or powertrain drive torque.

Optionally, the control system is configured to cause a turning moment to be induced at least in part by application of brake torque to a trailing up-slope wheel.

Optionally, the control system is configured to cause a turning moment to be induced by causing an amount of powertrain drive torque delivered to a trailing up-slope wheel to exceed that delivered to a trailing down-slope wheel.

The difference in powertrain drive torque may be established by reducing the powertrain torque to an inside trailing wheel and/or by increasing the powertrain torque to an outside trailing wheel.

Optionally, the control system is configured to cause a turning moment to be induced by causing an amount of powertrain drive torque delivered to a trailing down-slope wheel to exceed that delivered to a trailing up-slope wheel.

It is to be understood that causing the amount of powertrain drive torque delivered to a trailing down-slope wheel to exceed that delivered to a trailing up-slope wheel is the converse of the strategy that would be used in the case of vehicle travel over a flat surface.

In some embodiments, the control system may be configured to cause a turning moment to be induced by causing an amount of powertrain drive torque delivered to a trailing up-slope wheel to exceed that delivered to a trailing down-slope wheel when the system is operating in a trailing up-slope set of one or more control modes. In addition or instead the system may be configured to cause a turning moment to be induced by causing an amount of powertrain drive torque delivered to a trailing down-slope wheel to exceed that delivered to a trailing up-slope wheel when the system is operating in a prescribed one or more trailing down-slope control modes.

The set of one or more trailing down-slope control modes may include a sand mode for travel over sand.

In some embodiments, the turning moment may be induced by establishing a powertrain torque difference across an axle when a driver depresses an accelerator pedal and a brake torque difference across an axle when a driver is not depressing the accelerator pedal.

The powertrain torque or brake torque differences may advantageously be established across a trailing axle.

Optionally the control system may be configured to cause adjustment of a suspension system to create a difference in ride-height on an up-slope side of the vehicle relative to a down-slope side of the vehicle.

The ride-height adjustment may be made by increasing a ride-height setting of a suspension system on a down-slope side of the vehicle and/or reducing a ride-height setting of a suspension system on an up-slope side of the vehicle.

The control system may be configured to cause adjustment of a vehicle body roll control system arranged to provide body roll correction to reduce vehicle body roll, the system being configured to cause a vehicle body roll control system to increase a resistance of a vehicle body to roll associated with the side-slope condition.

Optionally the control system is configured to operate in a selected one of a plurality of control modes of at least one subsystem of a vehicle, the system comprising a subsystem controller for initiating control of at least one subsystem in the selected one of the plurality of subsystem control modes, each of which corresponds to one or more different driving conditions for a vehicle.

Optionally the control system may be configured to determine whether to cause a turning moment by causing torque applied to an up-slope wheel to exceed that applied to a downslope wheel or by causing the torque applied to a down-slope wheel to exceed that applied to an up-slope wheel in dependence on one or more of the selected control mode, the value of trailing axle slip angle, and an amount of turning moment required.

The amount of turning moment required may be capped.

The control system may be operable in a manual control mode selection condition in which a user may select a required system control mode by means of user-operable mode selection input means.

The control system may be operable in an automatic mode selection condition in which the system is configured to select automatically an appropriate system control mode.

Optionally the control system comprises evaluation means for evaluating one or more driving condition indicators to determine the extent to which each of the subsystem control modes is appropriate, the system being configured in the automatic mode selection condition automatically to control the subsystem controller to initiate control of one or more subsystems in the subsystem control mode which is most appropriate.

Optionally the control modes are control modes of at least one vehicle subsystem selected from amongst an engine management system, a transmission system, a steering system, a brakes system and a suspension system.

Optionally the control modes are control modes of at least two vehicle subsystems selected from amongst an engine management system, a transmission system, a steering system, a brakes system and a suspension system.

The operating modes may be control modes of each of these systems.

Optionally, in each control mode the system is configured to cause each the one or more vehicle subsystems to be operated in a subsystem configuration mode appropriate to the driving condition.

For example, in the case of a vehicle sub-system in the form of a suspension system operable at a plurality of different ride-heights for a given vehicle loading, the subsystem configuration modes may include modes corresponding to different respective ride heights. In the case of a vehicle sub-system controller in the form of an engine or powertrain controller, the controller may be operable to provide different respective values of engine torque as a function of accelerator pedal position in each of a plurality of different powertrain controller configuration modes. A subsystem control mode may therefore correspond to a set of subsystem configuration modes, for example one configuration mode for each subsystem. For example in one operating mode a 'high' ride height subsystem configuration mode may be set for the suspension system and a 'slow' accelerator pedal map subsystem configuration mode may be set for the powertrain controller. Some subsystems may allow two different parameters to be set. Thus the suspension system may allow a vehicle body roll stiffness setting of the suspension to be set to one of a plurality of configuration modes such as low, medium or high.

Various possible known subsystem configuration modes will now be described. The reader is referred to US2003/0200016 for further details in respect of known types of subsystem configuration mode and the manner in which the configuration modes may be implemented. Other configuration modes are also useful. Other subsystems may also be controlled, in addition or instead.

Optionally, the control modes include control modes of a suspension system and the plurality of subsystem configuration modes comprise a plurality of ride heights.

The control modes may include control modes of a fluid suspension system in which fluid interconnection can be made between suspensions for wheels on opposite sides of the vehicle, and wherein said plurality of subsystem configuration modes provide different levels of said interconnection.

Optionally the control modes include control modes of a steering system which can provide steering assistance, and wherein said plurality of subsystem configuration modes provide different levels of said steering assistance.

Optionally, the control modes include control modes of a brakes system which can provide braking assistance, and said plurality of subsystem configuration modes provide different levels of said braking assistance.

Optionally, the control modes include control modes of a brake control system which can provide an anti-lock function to control wheel slip, and said plurality of subsystem configuration modes allow different levels of said wheel slip.

Optionally, the control modes include control modes of a traction control system which is arranged to control wheel spin, and said plurality of subsystem configuration modes allow different levels of said wheel spin.

Optionally, the control modes include control modes of a yaw control system which is arranged to control vehicle yaw, and said plurality of subsystem configuration modes allow different levels of divergence of said vehicle yaw from an expected yaw.

Optionally, the control modes include control modes of a range change transmission and said subsystem configuration modes include a high range mode and a low range mode of said transmission.

The range change transmission may for example be comprised by a power transfer unit or power take-off unit for coupling a prop shaft of a driveline to a torque transmission path from an engine or transmission of the vehicle, such as an automatic transmission.

Optionally, the control modes include control modes of a powertrain system which includes a powertrain control means and an accelerator or throttle pedal, the subsystem configuration modes providing different levels of responsiveness of the powertrain control means to movement of the accelerator or throttle pedal.

Optionally, the control modes include control modes of a transmission system operable in a plurality of transmission ratios and including a transmission control means (such as an electronic transmission controller) arranged to monitor at least one parameter of the vehicle and to select the transmission ratios in response, and wherein the subsystem configuration modes include a plurality of transmission configuration modes in which the transmission ratios are selected differently in response to said at least one parameter.

One of the subsystems may comprise a differential system operable to provide a plurality of levels of differential lock, and the subsystem configuration modes may be arranged to provide different levels of said lock.

The differential system may be arranged to control the level of differential lock on the basis of a plurality of inputs, and to respond differently to said inputs in each of the modes.

The differential system may comprise a center differential, a front differential and/or a rear differential. The differential may be a clutch-based system in some embodiments, whereby differences in rates of rotation of wheels is accommodated by slipping of a clutch rather than by means of a conventional differential gear arrangement in which side wheels are coupled via pinion wheels supported by a differential cage in order to allow relative rotation.

One of the subsystems may comprise a vehicle body roll control system arranged to provide body roll correction to reduce vehicle body roll and the subsystem configuration modes provide different levels of body roll correction of the vehicle, at least under some driving conditions.

One of the subsystems may comprise a speed control system arranged to control the speed of the vehicle when descending a hill. The speed control system may be arranged to control the vehicle to different speeds in the different configuration modes.

Optionally, the operating modes may include an off-road mode in which the subsystems are controlled in a manner suitable for driving on rough terrain and an on-road mode in which the subsystems are controlled in a manner suitable for driving on-road.

Optionally the suspension system is arranged to provide a higher ride height in the off road mode than in the on-road mode.

Further optionally, in the off-road mode a higher level of said interconnection is provided than in the on-road mode.

The traction control system may be arranged to allow less wheel spin in the off-road mode than in the on-road mode.

Optionally the yaw control system is arranged to allow a higher degree of said divergence in the off-road mode than in the on-road mode.

Optionally, in the off-road mode the range change transmission is operated in the low range.

Optionally, in the off-road mode the powertrain control means is arranged to provide lower levels of drive torque, for a given accelerator or throttle pedal position, at least at low levels of accelerator pedal depression, than in the on-road mode.

Optionally, the differential system is arranged to provide higher levels of differential lock in the off-road mode than in the on-road mode.

Optionally, the vehicle body roll control system is arranged to provide a higher body roll stiffness in the on-road mode than in the off-road mode.

Optionally, the speed control system is arranged not to be placed in an operational state in the off-road mode and to be placed in an operational state in the on-road mode.

Optionally, the driving modes include at least one low friction mode in which the subsystems are controlled in a manner suitable for driving on low friction surfaces and a high friction mode in which the subsystems are controlled in a manner suitable for driving on high friction surfaces.

Optionally, the brake control system allows higher levels of slip in the high friction mode than in the low friction mode. Alternatively, the brake control system may allow higher levels of slip in the low friction mode than in the high friction mode.

Optionally, the traction control system allows higher levels of wheel spin in the high friction mode than in the low friction mode. Alternatively, the traction control system may allow higher levels of wheel spin in the low friction mode than in the high friction mode.

Optionally, the braking control system provides a greater level of braking assistance in the high friction mode than in the low friction mode.

Optionally, the powertrain control means is arranged to provide lower levels of drive torque, for a given accelerator or throttle pedal position, at least at low levels of accelerator pedal depression, in the low friction mode than in the high friction mode.

Optionally, the transmission system is arranged to operate in higher gears for a given value of said at least one parameter in the high friction mode than in the low friction mode.

Optionally, the differential system is arranged to provide higher levels of differential lock in the low friction mode than in the high friction mode.

Optionally, the high friction mode may comprise a standard or default mode in which the vehicle will operate normally and which is suitable for on-road driving.

Optionally, there are at least two such low friction modes and the suspension system is arranged to provide a higher ride height in one of the low friction modes than in the other.

Further optionally, there are at least two such low friction modes and the suspension system is arranged to provide a higher level of said cross linking in one of the low friction modes than in the other.

Optionally, the at least two low friction modes may comprise a mud mode suitable for traveling through deep mud, and another low friction mode suitable for driving in snow, on grass, or on gravel.

Optionally there may be a plurality of low friction modes, one of which may be a grass mode in which the subsystems are controlled in a manner suitable for driving on grass, one of which may be an ice mode in which the subsystems are controlled in a manner suitable for driving in ice, and one of which may be a mud mode in which the subsystems are controlled in a manner suitable for driving on mud.

Optionally one of the modes is a sand mode in which the subsystems are controlled in a manner suitable for driving on sand. At least one of the subsystems may be arranged, in the sand mode, to allow only relatively low levels of wheel spin when the vehicle is traveling at low speeds so as to avoid the vehicle wheels becoming submerged in sand, but to allow relatively high levels of wheel spin when the vehicle is traveling at higher speeds. Optionally, in the sand mode, the powertrain control system is arranged to provide relatively low levels of drive torque for a given throttle pedal position at low vehicle speeds and to provide relatively high levels of drive torque for a given throttle pedal position at higher vehicle speeds.

The off-road mode may be a rock crawl mode in which the subsystems are controlled in a manner suitable for driving over rocks. Alternatively it may be set up for more general off-road use. One or more other off-road modes may be provided in addition or instead.

One of the modes may be a rough-road mode in which the subsystems are controlled in a manner suitable for driving on rough roads, for example for driving at relatively high speeds over rough surfaces.

At least one of the modes may be a plough surface mode in which the brake control subsystem is arranged to allow a relatively high degree of wheel slip under braking. This may be useful, for example on snow or sand, where the build-up of matter in front of the wheels under braking can improve braking performance.

Optionally, at least one of the modes is an on-road mode in which the subsystems are controlled in a manner suitable for driving on-road. For example, one of the modes may be a highway or motorway mode in which the subsystems are controlled in a manner suitable for driving at high speed (typically 80 kph (50 mph) or more) on a substantially flat road surface. One of the modes may be a country road mode in which the subsystems are controlled in a manner suitable for driving on country roads, which generally have more frequent and tighter bends, resulting in a lower average speed and a less even vehicle speed.

The driving modes may be selectable by means of at least one of at least two inputs, one of which may be a terrain selection input arranged to influence the mode selected on the basis of the terrain selected, and the other of which may be a mode of use input arranged to influence the mode selected on the basis of a selected mode of use of the vehicle. Each of these inputs may be user-controlled inputs, or may be derived from one or more sensors.

The mode of use input may be arranged to allow selection between a plurality of driving styles, which may include, for example, a normal style, a sport style, and an economy style.

Alternatively, or in addition, the mode of use input may be arranged to allow selection between a plurality of states of the vehicle, for example including a towing state or a loaded state.

Optionally the control system is operable to suspend a change in an amount of torque applied to one or more wheels by a stability control system in response to detection of understeer or oversteer.

Operation of a control system to induce a turning moment on a vehicle in dependence on detection of a side-slope in the manner described above may be referred to as a side-slope trailing axle slip correction function. The side-slope trailing axle slip correction function is to be understood to be a function implemented in addition to a function implemented by a conventional stability control system, where fitted to a vehicle.

In some embodiments, intervention by one or more stability control systems such as a dynamic stability control system (DSC), traction control system (TCS) or the like may be suspended when a side-slope condition is detected and the side-slope trailing axle slip correction function is causing application of a turning moment according to the methodology described herein. In some embodiments yaw correction, for example to compensate for understeer or oversteer, may be suspended whilst traction control, to compensate for wheel spin during acceleration, may continue to operate according to subsystem configuration parameters for the traction control subsystem selected according to the control mode in which the system is operating.

Alternatively, in some embodiments one or more conditions that must be met in order for a stability control system to intervene to reduce excessive yaw may be changed, in dependence on detection of a side slope condition. In some embodiments the one or more conditions for intervention by a DSC may be changed to delay intervention to values of Angle_TAS that are greater than Angle_TASt when a side slope condition is detected. For example, if Angle_TASt is set to 15 degrees, the threshold for DSC intervention may be or correspond to a value of Angle_TAS of 20 degrees, 25 degrees, 30 degrees or any other suitable value.

This feature has the advantage that vehicle composure may be enhanced because a specific control methodology is employed to compensate for yaw error when a side-slope condition exists rather than relying on a stability control system optimized for travel over relatively level ground. Embodiments of the present invention enable a substantial enhancement in vehicle composure when negotiating side-slopes and enhance driver confidence in vehicle handling as well as occupant comfort.

In a further aspect of the invention for which protection is sought there is provided a vehicle comprising a system according to another aspect of the invention.

The vehicle may be adapted for off-road driving.

In a further aspect of the invention for which protection is sought there is provided a method of controlling a vehicle comprising:

detecting a side-slope condition in which a vehicle is traversing a side-slope; and controlling an amount of torque applied to one or more wheels to induce a turning moment on a vehicle, the method comprising causing a turning moment to be induced in a direction opposing side-slip of a trailing axle in a down-slope direction relative to a leading axle.

In a still further aspect of the invention for which protection is sought there is provided a carrier medium carrying computer readable code for controlling a vehicle to carry out a method according to an aspect of the invention.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

For the avoidance of doubt, it is to be understood that features described with respect to one aspect of the invention may be included within any other aspect of the invention, alone or in appropriate combination with one or more other features.

BRIEF DESCRIPTION OF THE DRAWINGS

One or more embodiments of the invention will now be described, by way of example only, with reference to the accompanying figures in which.

DETAILED DESCRIPTION

Figure 1:
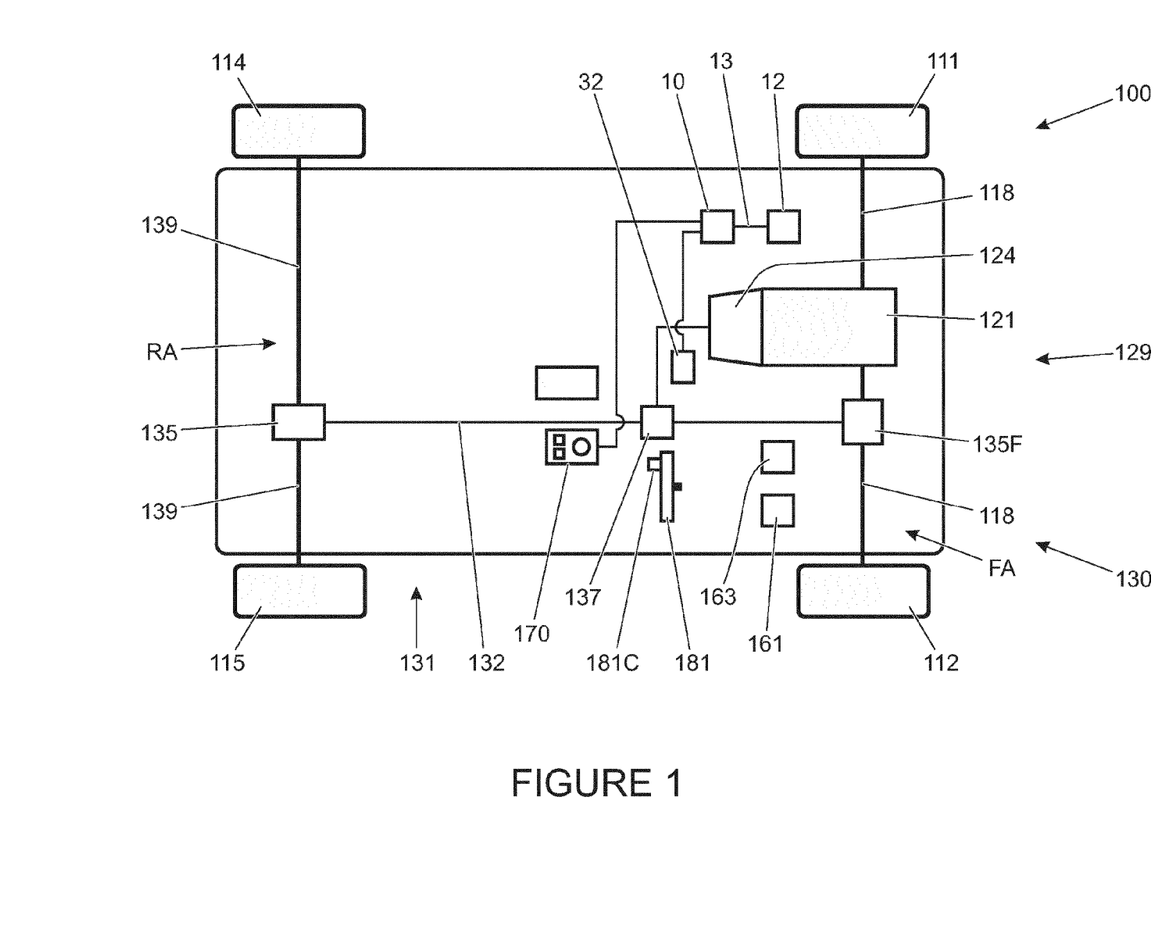
FIG. 1 is a schematic illustration of a vehicle according to an embodiment of the present invention.

FIG. 1 shows a vehicle 100 according to an embodiment of the invention intended to be suitable for off-road use, that is for use on terrains other than regular tarmac road, as well as on-road. The vehicle 100 has a powertrain 129 that includes an engine 121 that is connected to a driveline 130 having a transmission 124. In the embodiment shown the transmission 124 is an automatic transmission 124. Embodiments of the present invention are also suitable for use in vehicles with a manual transmission, continuously variable transmission or any other suitable transmission.

The driveline 130 is arranged to drive a pair of front vehicle wheels 111,112 by means of a front differential 135F and a pair of front drive shafts 118. The front wheels 111, 112, front differential 135F and front driveshafts 118 may be considered to constitute a front axle FA of the vehicle 100. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139. The rear wheels 114, 115, rear differential 135 and rear driveshafts 139 may be considered to constitute a rear axle RA of the vehicle 100. Embodiments of the invention are suitable for use with vehicles in which the transmission is arranged to drive only a pair of front wheels or only a pair of rear wheels (i.e. front wheel drive vehicles or rear wheel drive vehicles) or selectable two wheel drive/four wheel drive vehicles. In the embodiment of FIG. 1 the transmission 124 is releasably connectable to the auxiliary driveline portion 131 by means of a power transfer unit (PTU) 137, allowing selectable two wheel drive or four wheel drive operation. It is to be understood that embodiments of the invention may be suitable for vehicles having more than four wheels or where only two wheels are driven, for example two wheels of a three wheeled vehicle or four wheeled vehicle or a vehicle with more than four wheels.

The PTU 137 is operable in a 'high ratio' or a low ratio' configuration, in which a gear ratio between an input shaft and an output shaft thereof is selected to be a high or low ratio. The high ratio configuration is suitable for general on-road or 'on-highway' operations whilst the low ratio configuration is more suitable for negotiating certain off-road terrain conditions and other low speed applications such as towing.

The vehicle 100 has an accelerator pedal 161, brake pedal 163 and steering wheel 181. The steering wheel 181 has a cruise control selector button 181C mounted thereto. The vehicle 100 has a central controller, referred to as a vehicle control unit (VCU) 10. The VCU 10 receives and outputs a plurality of signals to and from various sensors and subsystems 12 provided on the vehicle 100.

Figure 2:
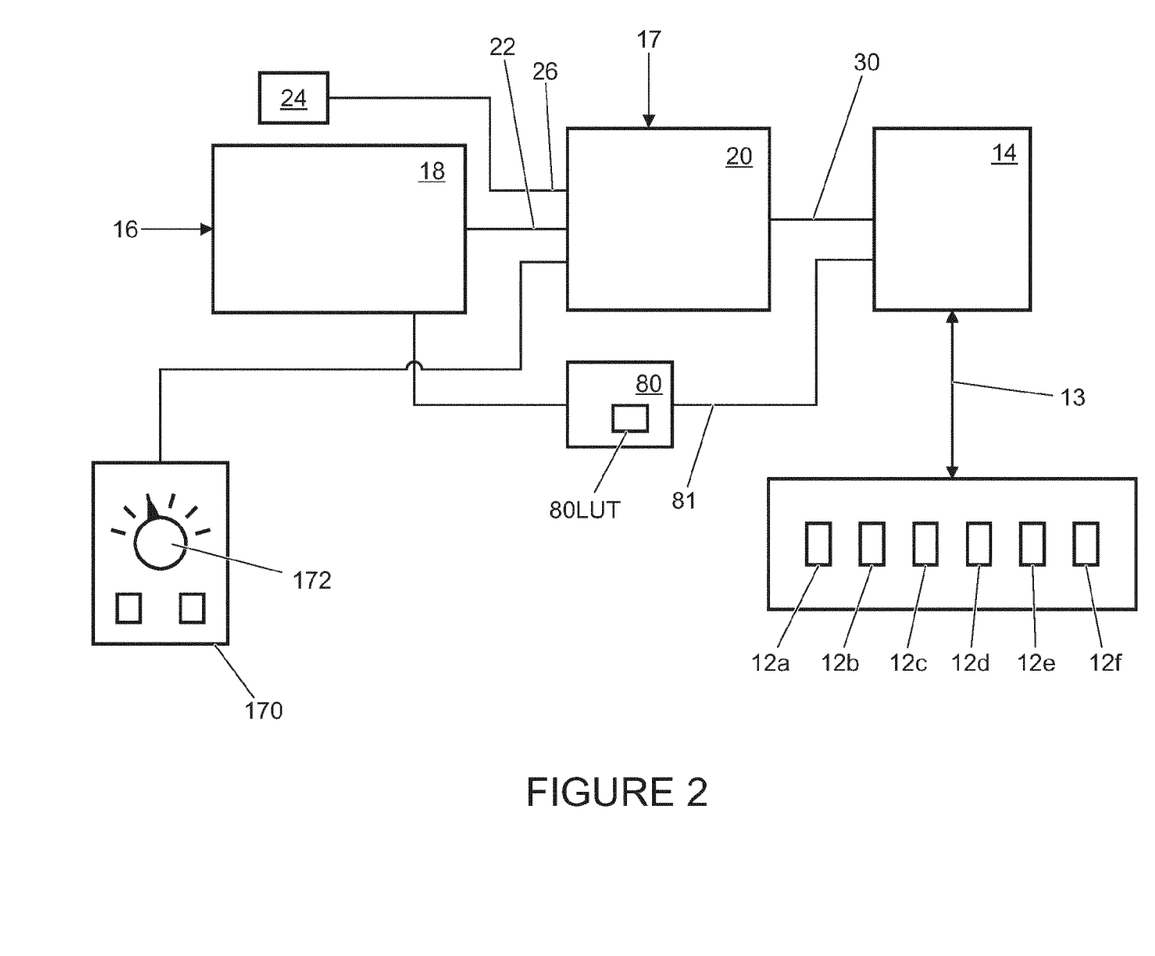
FIG. 2 is a block diagram to illustrate a vehicle control system in accordance with an embodiment of the invention, including various vehicle subsystems under the control of the vehicle control system.

FIG. 2 shows the VCU 10 in more detail. The VCU 10 controls a plurality of vehicle subsystems 12 including, but not limited to, an engine management system 12a, a transmission system 12b, an electronic power assisted steering unit 12c (ePAS unit), a brakes system 12d, a suspension system 12e and a driveline system 12f. Although six subsystems are illustrated as being under the control of the VCU 10, in practice a greater number of vehicle subsystems may be included on the vehicle and may be under the control of the VCU 10. The VCU 10 includes a subsystem control module 14 which provides control signals via line 13 to each of the vehicle subsystems 12 to initiate control of the subsystems in a manner appropriate to the driving condition, such as the terrain, in which the vehicle is travelling (referred to as the terrain condition). The subsystems 12 also communicate with the subsystems control module 14 via signal line 13 to feedback information on subsystem status. In some embodiments, instead of an ePAS unit 12c, a hydraulically operated power steering unit may be provided.

The VCU 10 receives a plurality of signals, represented generally at 16 and 17, which are received from a plurality of vehicle sensors and are representative of a variety of different parameters associated with vehicle motion and status. As described in detail in GB2492655, the signals 16, 17 provide, or are used to calculate, a plurality of driving condition indicators (also referred to as terrain indicators) which are indicative of the nature of the condition in which the vehicle is travelling. One advantageous feature of some embodiments of the present invention is that the VCU 10 determines the most appropriate control mode for the various subsystems on the basis of the terrain indicators, and automatically controls the subsystems accordingly. That is, the VCU 10 determines the most appropriate control mode on the basis of the terrain indicators and automatically causes each of the subsystems 12 to operate in the respective subsystem configuration mode corresponding to that control mode.

The sensors (not shown) on the vehicle include, but are not limited to, sensors which provide continuous sensor outputs 16 to the VCU 10, including wheel speed sensors, ride height sensors, suspension articulation sensors, an ambient temperature sensor, an atmospheric pressure sensor, tire pressure sensors, yaw sensors to detect yaw, roll and pitch of the vehicle, a vehicle speed sensor, a longitudinal acceleration sensor, an engine torque sensor (or engine torque estimator), a steering angle sensor, a steering wheel speed sensor, a gradient sensor (or gradient estimator), a lateral acceleration sensor (part of a stability control system (SCS)), a brake pedal position sensor, an acceleration pedal position sensor and longitudinal, lateral, vertical motion sensors.

In other embodiments, only a selection of the aforementioned sensors may be used. The VCU 10 also receives a signal from the electronic power assisted steering unit (ePAS unit 12c) of the vehicle to indicate the steering force that is applied to the wheels (steering force applied by the driver combined with steering force applied by the ePAS unit 12c).

The vehicle 100 is also provided with a plurality of sensors which provide discrete sensor output signals 17 to the VCU 10, including a cruise control status signal (ON/

OFF), a transfer box or PTU 137 status signal (whether the gear ratio is set to a HI range or a LO range), a Hill Descent Control (HDC) status signal (ON/OFF), a trailer connect status signal (ON/OFF), a signal to indicate that the Stability Control System (SCS) has been activated (ON/OFF), a windscreen wiper signal (ON/OFF), an air suspension ride-height status signal (HI/LO), and a Dynamic Stability Control (DSC) signal (ON/OFF).

The VCU 10 includes an evaluation means in the form of an estimator module or processor 18 and a calculation and selection means in the form of a selector module or processor 20. Initially the continuous outputs 16 from the sensors are provided to the estimator module 18 whereas the discrete signals 17 are provided to the selector module 20.

Within a first stage of the estimator module 18, various ones of the sensor outputs 16 are used to derive a number of terrain indicators. In a first stage of the estimator module 18, a vehicle speed is derived from the wheel speed sensors, wheel acceleration is derived from the wheel speed sensors, the longitudinal force on the wheels is derived from the vehicle longitudinal acceleration sensor, and the torque at which wheel slip occurs (if wheel slip occurs) is derived from the motion sensors to detect yaw, pitch and roll. Other calculations performed within the first stage of the estimator module 18 include the wheel inertia torque (the torque associated with accelerating or decelerating the rotating wheels), "continuity of progress" (the assessment of whether the vehicle is starting and stopping, for example as may be the case when the vehicle is travelling over rocky terrain), aerodynamic drag, yaw rate, and lateral vehicle acceleration.

The estimator module 18 also includes a second stage in which the following terrain indicators are calculated: surface rolling resistance (based on the wheel inertia torque, the longitudinal force on the vehicle, aerodynamic drag, and the longitudinal force on the wheels), the steering force on the steering wheel 181 (based on the lateral acceleration and the output from the steering wheel sensor), the wheel longitudinal slip (based on the longitudinal force on the wheels, the wheel acceleration, SCS activity and a signal indicative of whether wheel slip has occurred), lateral friction (calculated from the measured lateral acceleration and the yaw versus the predicted lateral acceleration and yaw), and corrugation detection (high frequency, low amplitude wheel height excitement indicative of a washboard type surface).

The SCS activity signal is derived from several outputs from an SCS ECU (not shown), which contains the DSC (Dynamic Stability Control) function, the TC (Traction Control) function, ABS and HDC algorithms, indicating DSC activity, TC activity, ABS activity, brake interventions on individual wheels, and engine torque reduction requests from the SCS ECU to the engine. All these indicate a slip event has occurred and the SCS ECU has taken action to control it. The estimator module 18 also uses the outputs from the wheel speed sensors to determine a wheel speed variation and corrugation detection signal.

On the basis of the windscreen wiper signal (ON/OFF), the estimator module 18 also calculates how long the windscreen wipers have been in an ON state (i.e. a rain duration signal).

The VCU 10 also includes a road roughness module 24 for calculating the terrain roughness based on the air suspension sensors (the ride height sensors) and the wheel accelerometers. A terrain indicator signal in the form of a roughness output signal 26 is output from the road roughness module 24.

The estimates for the wheel longitudinal slip and the lateral friction estimation are compared with one another within the estimator module 18 as a plausibility check.

Calculations for wheel speed variation and corrugation output, the surface rolling resistance estimation, the wheel longitudinal slip and the corrugation detection, together with the friction plausibility check, are output from the estimator module 18 and provide terrain indicator output signals 22, indicative of the nature of the terrain in which the vehicle is travelling, for further processing within the VCU 10.

The terrain indicator signals 22 from the estimator module 18 are provided to the selector module 20 for determining which of a plurality of vehicle subsystem control modes (and therefore corresponding subsystem configuration modes) is most appropriate based on the indicators of the type of terrain in which the vehicle is travelling. The most appropriate control mode is determined by analyzing the probability that each of the different control modes is appropriate on the basis of the terrain indicator signals 22, 26 from the estimator module 18 and the road roughness module 24.

The vehicle subsystems 12 may be controlled automatically in a given subsystem control mode (in an "automatic mode" or "automatic condition" of operation of the VCU 10) in response to a control output signal 30 from the selector module 20 and without the need for driver input. Alternatively, the vehicle subsystems 12 may be operated in a given subsystem control mode according to a manual user input (in a "manual mode" or "manual condition" of operation of the VCU 10) via a Human Machine Interface (HMI) module 32. Thus the user determines in which subsystem control mode the subsystems will be operated by selection of a required system control mode (operating mode). The HMI module 32 comprises a display screen (not shown) and a user operable switchpack 170. The user may select between the manual and automatic modes (or conditions) of operation of the VCU 10 via the switchpack 170 by causing a control knob 172 to toggle between a retracted position and an exposed position, by pressing on the knob 172. When the knob is in the exposed position the VCU 10 operates in the manual mode or condition. The switchpack 170 also allows the user to select the desired subsystem control mode by rotation of control knob 172 when in the manual mode or condition.

It is to be understood that the subsystem controller 14 may itself control the vehicle subsystems 12a-12f directly via the signal line 13, or alternatively each subsystem may be provided with its own associated intermediate controller (not shown in FIG. 1) for providing control of the relevant subsystem 12a-12f. In the latter case the subsystem controller 14 may only control the selection of the most appropriate subsystem control mode for the subsystems 12a-12f, rather than implementing the actual control steps for the subsystems. The or each intermediate controller may in practice form an integral part of the main subsystem controller 14.

Figure 3:
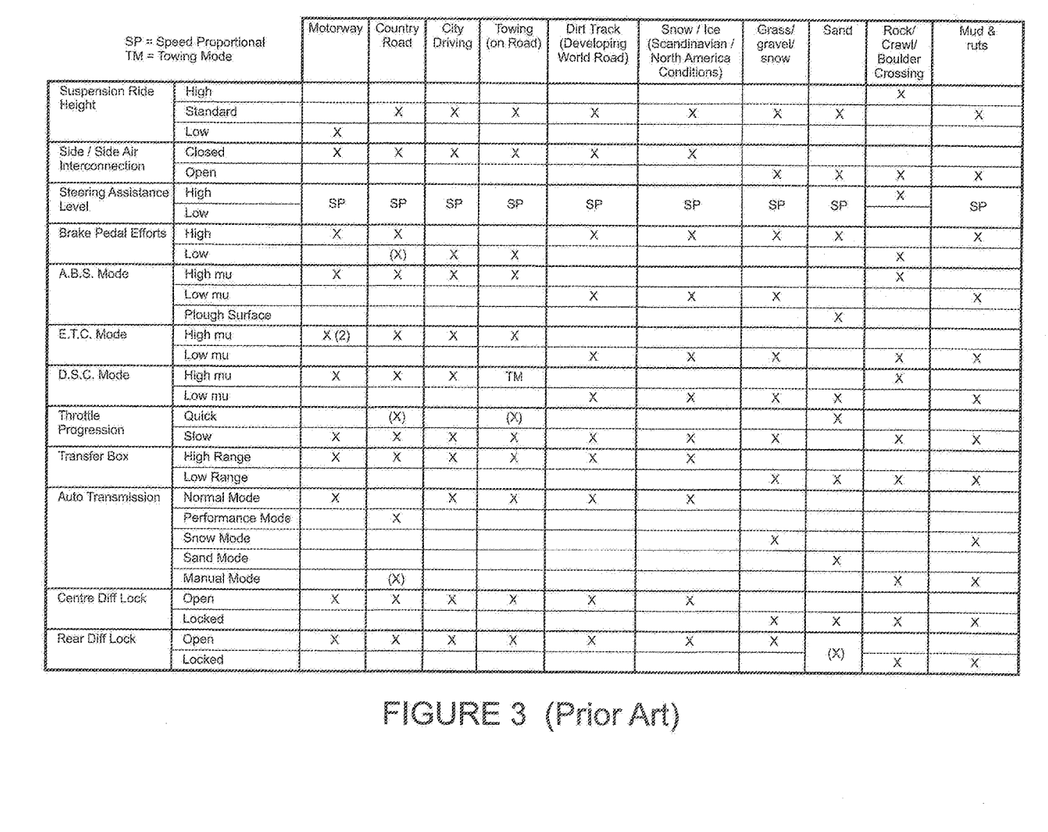
FIG. 3 is a table showing which vehicle subsystem configuration mode is selected in each respective vehicle operating mode.

FIG. 3 is a table taken from US2003/0200016 showing the particular sub-system configuration modes assumed by the subsystems 12 of the vehicle 100 in the respective different operating modes in which the VCU 10 may operate.

The operating modes are:
(a) A motorway (or highway) mode;
(b) A country road mode;
(c) A city driving (urban) mode;
(d) A towing (on-road) mode;
(e) A dirt track mode;
(f) A snow/ice (on-road) mode;
(g) A GGS mode;
(h) A sand mode;

(i) A rock crawl or boulder crossing mode; and
(j) A mud/ruts mode

With reference to FIG. 3, the configuration of the suspension system 12e is specified in terms of ride height (high, standard or low) and side/side air interconnection. The suspension system 12e is a fluid suspension system, in the present embodiment an air suspension system, allowing fluid interconnection between suspensions for wheels on opposite sides of the vehicle in the manner described in US2003/0200016. The plurality of subsystem configuration modes provide different levels of said interconnection, in the present case no interconnection (interconnection closed) and at least partial interconnection (interconnection open).

The configuration of the ePAS steering unit 12c may be adjusted to provide different levels of steering assistance, wherein steering wheel 181 is easier to turn the greater the amount of steering assistance. The amount of assistance may be inversely proportional to vehicle speed in some operating modes.

The brakes system 12d may be arranged to provide relatively high brake force for a given amount of pressure applied to the brake pedal 163 or a relatively low brake force, depending on the operating mode.

The brakes system 12d may also be arranged to allow different levels of wheel slip when an anti-lock braking system is active, (relatively low amounts on low friction ("low-mu" surfaces) and relatively large amounts on high friction surfaces).

An electronic traction control (ETC) system may be operated in a high mu or low mu configuration, the system tolerating greater wheel slip in the low mu configuration before intervening in vehicle control compared with a high mu configuration.

A dynamic stability control system (DSC) may also be operated in a high mu or low mu configuration.

The engine management system 12a may be operated in 'quick' or 'slow' accelerator (or throttle) pedal progression configuration modes in which an increase in engine torque as a function of accelerator pedal progression is relatively quick or slow, respectively. The rate may be dependent on speed in one or more modes such as Sand mode.

The PTU 137 may be operated in a high range (HI) subsystem configuration mode or low range (LO) subsystem configuration mode as described herein.

The transmission 124 may be operated in a "normal" mode that provides a reasonable compromise between fuel economy and driving performance, a "performance" mode which generally keeps the transmission in lower gears than in the normal mode, particularly when the driver is requesting a high level of driving torque to accelerate the vehicle, and a "manual" mode in which the control of gear changes is given completely to the driver. There is also a "snow" or "ice" mode which generally keeps the transmission in higher gears than the normal mode, in particular under acceleration from rest, to avoid loss of traction due to wheel spin, and a "sand" mode which keeps the transmission in relatively high gears at low speed to avoid excessive wheel spin. Excessive wheel spin can result in the wheels digging themselves into the sand at low speeds. However, the sand mode uses relatively low gears at higher speeds where a relatively high degree of wheel slip can be desirable to provide maximum traction. Lower gearing also helps the engine 121 to remain in an operating region where the engine speed is high and the power output is high, thereby helping to avoid the vehicle 100 becoming "bogged down" by a lack of power.

In some embodiments, a center differential and a rear differential each include a clutch pack and are controllable to vary the degree of locking between a "fully open" and a "fully locked" state. The actual degree of locking at any one time may be controlled on the basis of a number of factors in a known manner, but the control can be adjusted so that the differentials are "more open" or "more locked". Specifically the pre-load on the clutch pack can be varied which in turn controls the locking torque, i.e. the torque across the differential that will cause the clutch, and hence the differential, to slip. A front differential could also be controlled in the same or similar way.

Figure 4:
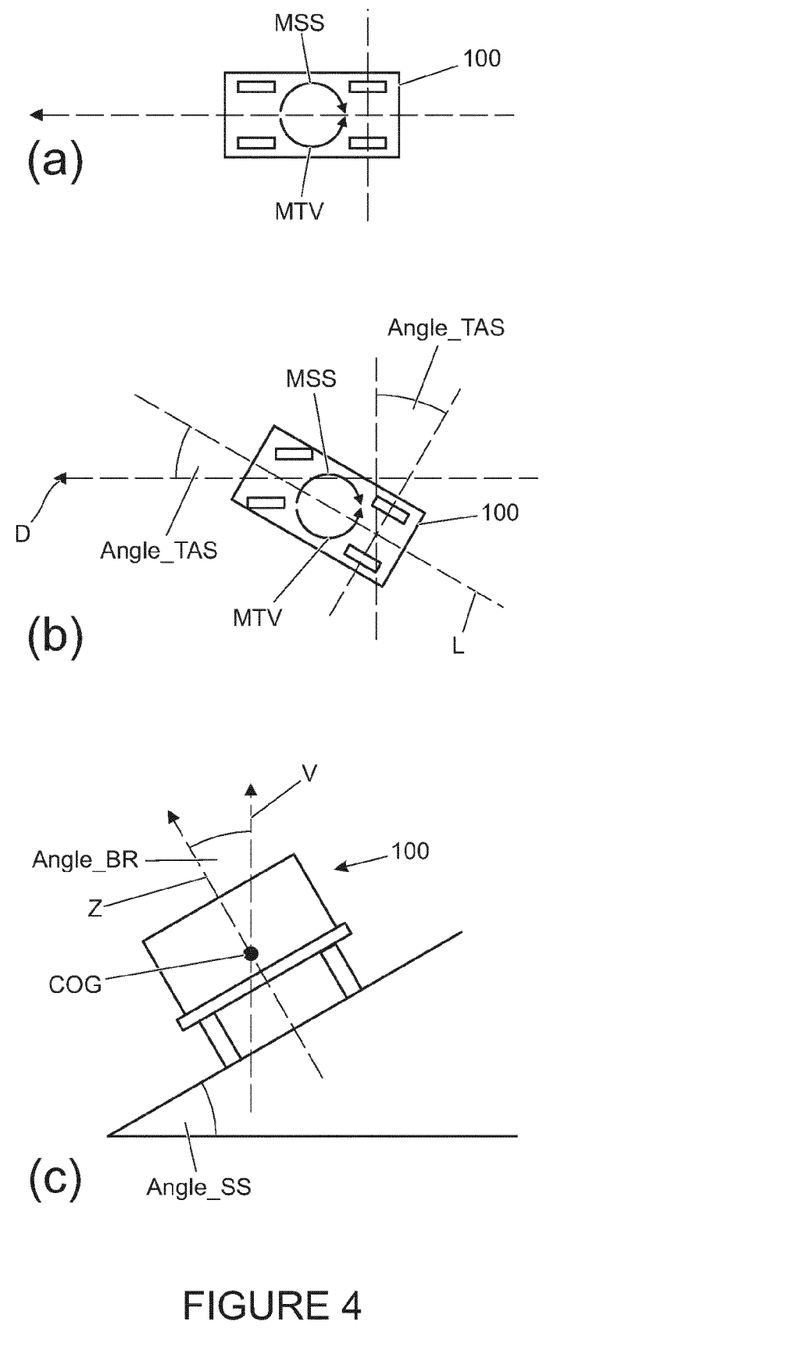
FIG. 4 is a schematic illustration showing a vehicle according to an embodiment of the present invention traversing a sideslope (a) in plan view showing initial application of a turning moment upon detection of a sideslope; (b) in plan view showing a non-zero trailing axle slip angle due to the sideslope; and (c) as viewed from behind the vehicle following correction of the trailing axle slip angle substantially to zero.

The VCU 10 is configured to monitor a slope of a driving surface over which the vehicle 100 is moving by reference to the signals 16 received thereby. In particular, the estimator module 18 of the VCU 10 is configured to determine an angle by which the driving surface is tilted about a line parallel to a direction of movement or path of the vehicle 100 over ground. This angle may be referred to as a side-slope angle, Angle_SS and is illustrated schematically in FIG. 4(c). The side-slope angle may be determined by reference to sensors indicative of vehicle body roll angle Angle_BR (FIG. 4(c)), being an angle between a vertical axis Z of vehicle 100 and a true vertical axis V with respect to gravity.

The VCU 10 is configured to calculate the value of Angle_SS by adjusting the value of roll angle derived from roll rate sensor data in order to take into account vehicle body roll due to centripetal forces during cornering, in order more accurately to determine the side-slope angle Angle_SS. In some embodiments the value of Angle_SS may be determined by reference to a signal indicative of lateral acceleration and a filtered derivative of this signal. The filtered derivative may for example correspond to the rate of change of lateral acceleration after passing through a low pass filter.

The VCU 10 also calculates an angle between a longitudinal axis L of the vehicle 100 and a direction of travel D of the vehicle 100. This latter angle may be referred to as a trailing axle slip angle, Angle_TAS as shown in FIG. 4(b). The value of Angle_TAS may be estimated by reference to a difference (or error) between expected rate of change of vehicle yaw angle for the current vehicle speed and steering angle. This error may be referred to as a yaw error, yaw_err. Other ways of estimating Angle_TAS are also useful.

The value of side-slope angle Angle_SS is output to a side-slope compensation module 80 of the VCU 10.

If the module 80 detects that the vehicle 100 is negotiating a side-slope where Angle_SS exceeds a prescribed trigger threshold angle Angle_SSt, the module 80 determines whether the VCU 10 should command application of a turning moment on the vehicle 100 by torque vectoring, MTV (FIG. 1), in order to counter a turning moment on the vehicle 100 due to the side slope, MSS. In the present embodiment the prescribed value of Angle_SSt is 5 degrees. Other values are also useful. The value of Angle_SSt may be dependent on the selected control mode in some embodiments.

In the present embodiment, the value of MTV is determined by the module 80 by reference to a look-up table (LUT) 80LUT which outputs a value of MTV that is dependent on vehicle speed, Angle_SS, Angle_TAS and/or yaw_err, and the currently selected control mode. It is to be understood that in some control modes no turning moment MTV is applied in response to the identification of a side slope condition.

The module 80 outputs a command via signal line 81 to subsystem control module 14 which in turn causes engine management system 12a, driveline controller 12f and brakes system 12d to cause a turning moment to be established by torque vectoring. The subsystem 14 therefore causes a turning moment to be induced by suitable control of the engine management system 12a, driveline controller 12f and brakes system 12d, which provide the means for controlling the amount of torque applied to the one or more wheels 111, 112, 114, 115 in order to cause the required turning moment MTV to be induced in the direction opposing side-slip of the rear axle RA in a down-slope direction relative to the front axle FA.

In the present embodiment, torque vectoring is employed by a combination of application of braking force by means of the brakes system 12d (torque vectoring by braking, TVB) and distribution of drive torque between wheels by means of engine management system 12a and driveline system 12f (torque vectoring by powertrain, TVP). In the present embodiment TVB may be employed to establish the turning moment when the accelerator pedal 161 is not depressed whilst TVP may be employed to establish the turning moment when the accelerator pedal 161 is depressed. In some embodiments, TVB may be employed in addition to TVP if the available powertrain torque is insufficient to establish the required turning moment by TVP alone.

In the present embodiment, the VCU 10 commands the application of a finite turning moment MTV equal to a baseline value MTVB when the VCU 10 is operating in one of the prescribed set of control modes (GGS or Sand) regardless of the value of Angle_TAS or yaw_err, when Angle_SS exceeds the threshold value Angle_SSt. The turning moment thereby introduces a baseline turning moment or turning moment offset that biases the vehicle 100 towards a straight-ahead direction whenever Angle_SS exceeds Angle_SSt even if no side-slip of the trailing axle has yet occurred.

If the VCU 10 determines that the value of Angle_TAS exceeds a prescribed threshold value Angle_TASt, the VCU 10 increases the value of MTV above the baseline value MTVB in order to reduce Angle_TAS. In the present embodiment the value of Angle_TAS above which an increase in MTV above MTVB is caused is dependent on the control mode in which the VCU 10 is operating. In certain control modes such as GGS the critical angle triggering an increase in MTV is less than that in other modes such as Sand. This is at least in part because relatively soft, deformable surfaces such as Sand tend to be capable of accommodating larger values of Angle_TAS without substantial deformation/erosion of the surface whilst relatively fragile surfaces such as grass may be more susceptible to deformation even at relatively small values of Angle_TAS. Accordingly it may be preferable to reduce deformation of relatively fragile surfaces, at least in part because deformation of such surfaces may result in a surface offering reduced traction capability, such as a reduced value of surface coefficient of friction between the surface and a road wheel. In some embodiments the critical angle may be around 10 degrees if the VCU 10 is operating in the GGS control mode and around 15 degrees if the VCU 10 is operating in the Sand control mode. Other arrangements are also useful.

The VCU 10 employs a closed-loop feedback arrangement in order to modulate the value of MTV as required in an attempt to maintain Angle_TAS at a value less than the threshold angle Angle_TASt. In some embodiments the VCU 10 may attempt to maintain Angle_TAS at a value of substantially zero. Other arrangements are also useful.

It is to be understood that inducement of the turning moment may be accomplished by establishing a difference in powertrain torque between up-slope and downslope trailing wheels. Optionally, in addition a difference in powertrain torque may be established between front and rear axles, typically by increasing the torque at the rear axle relative to the front axle. It is to be understood that when travelling over certain surfaces such as sand, it may be undesirable to apply a brake to an inside trailing wheel in order to correct trailing axle side-slip. Rather, a difference in powertrain torque between trailing wheels across a trailing axle is preferred.

A center differential or other means may be employed for proportioning torque between front and rear axles. It is to be understood that it may be desirable to increase the proportion of torque applied to rear wheels in certain situations as noted above.

The difference in powertrain drive torque may be established by reducing the powertrain torque to an inside trailing wheel and/or by increasing the powertrain torque to an outside trailing wheel. This may be accomplished by varying torque distribution between trailing wheels by means of rear differential 135. In the present embodiment the rear differential 135 accommodates differences in speed between left and right rear wheels 114, 115 by allowing slippage of respective left and right clutch packs arranged to supply torque to respective left and right rear drive shafts 139 (which may be described as half shafts or quarter shafts).

Alternatively the VCU 10 may be configured to cause a turning moment to be induced by causing an amount of powertrain drive torque delivered to a trailing down-slope wheel to exceed that delivered to a trailing up-slope wheel.

In some embodiments, the VCU 10 may be configured to cause a turning moment to be induced on a vehicle in order to reduce Angle_TAS by causing an amount of powertrain drive torque delivered to a trailing up-slope wheel to exceed that delivered to a trailing down-slope wheel only when the system is operating in a trailing up-slope set of one or more control modes. In addition or instead the VCU 10 may be configured to cause a turning moment to be induced by causing an amount of powertrain drive torque delivered to a trailing down-slope wheel to exceed that delivered to a trailing up-slope wheel only when the VCU 10 is operating in a prescribed one or more trailing down-slope control modes.

The set of one or more trailing down-slope control modes may include a sand mode for travel over sand.

It is to be understood that causing the amount of powertrain drive torque delivered to a trailing down-slope wheel to exceed that delivered to a trailing up-slope wheel is the converse of the strategy that would be used in the case of vehicle travel over a flat surface. In some embodiments, the system does not attempt to cause a turning moment to be induced by causing an amount of powertrain drive torque delivered to a trailing up-slope wheel to exceed that delivered to a trailing down-slope wheel.

In some embodiments, the turning moment may be induced by establishing a powertrain torque difference across an axle when a driver depresses an accelerator pedal and a brake torque difference across an axle when a driver is not depressing the accelerator pedal.

The powertrain torque or brake torque differences may advantageously be established across a trailing axle.

Figure 5:
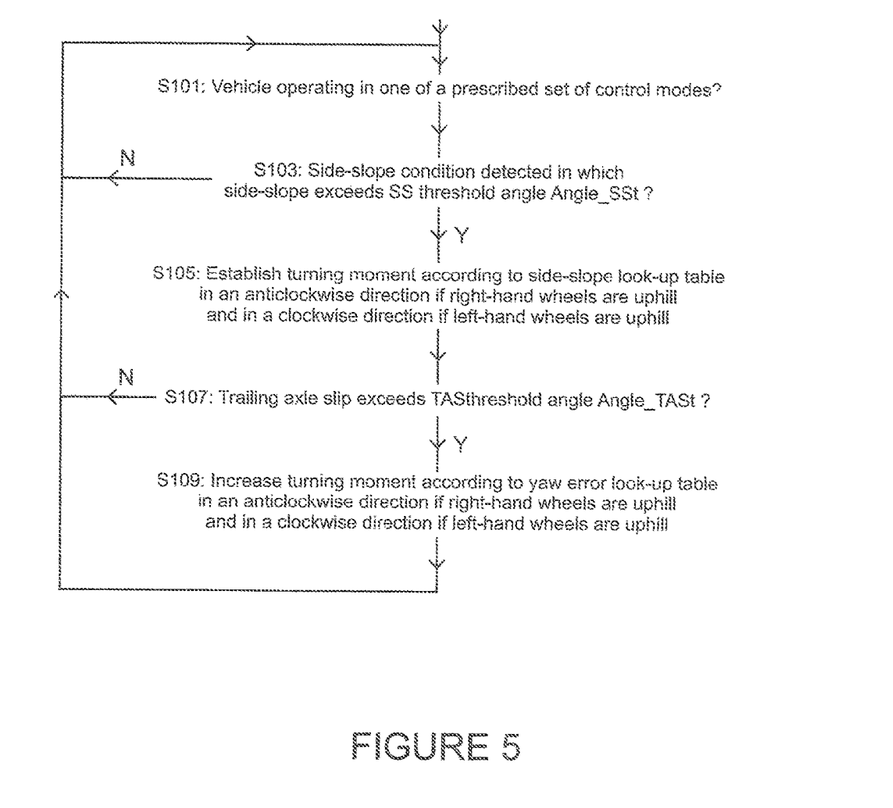
FIG. 5 is a schematic illustration of a method of operation of a vehicle according to an embodiment of the present invention.

FIG. 5 illustrates a method of operating of a vehicle 100 according to an embodiment of the present invention.

At step S101 VCU 10 of vehicle 100 is operating in a selected control mode in either the manual control mode selection condition or the automatic mode selection condition according to the position of selector knob 172. The VCU 10 determines at step S101 whether the VCU 10 is operating in one a prescribed set of control modes, in the present embodiment the GGS or Sand modes. If the VCU 10 is operating in one of these modes the VCU 10 continues at step S103. Otherwise the VCU 10 repeats step S101.

At step S103 the VCU 10 determines whether a side-slope condition exists by reference to the value of side-slope angle Angle_SS. If the value of Angle_SS exceeds threshold side-slope angle Angle_SSCt (5 degrees if the GGS control mode is selected and 10 degrees if the Sand mode is selected) the VCU 10 continues at step S105, otherwise the VCU 10 continues at step S101.

At step S105 the VCU 10 commands (via subsystem control module 14) the application of a baseline turning moment MTVB on the vehicle 100 the magnitude of which is determined by reference to a side-slope look-up table stored in a memory thereof. The amount of the turning moment is dependent on the selected control mode, vehicle speed and the value of Angle_SS. The turning moment may be dependent at least in part on steering angle in addition or instead in some embodiments. The turning moment is applied in such a direction as to oppose slipping of a rear axle of the vehicle 100 in a downhill direction relative to a front axle. The VCU 10 then continues at step S107.

At step S107 the VCU 10 checks whether a value of a trailing axle slip angle, Angle_TAS, exceeds a trigger threshold value Angle_TASt. If Angle_TAS>Angle_TASt the VCU 10 continues at step S109, otherwise the VCU 10 continues at step S101.

At step S109 the VCU 10 employs a look-up table to provide parameters for a closed-loop feedback arrangement that attempts to reduce the value of Angle_TAS below Angle_TASt. The parameters are arranged to cause the value of MTV to increase at a relatively fast or relatively slow rate in dependence at least in part on the selected control mode and vehicle speed. The VCU 10 then continues at step S101.

Instead of checking the value of Angle_TAS, in some embodiments at step S107 the VCU 10 checks whether an amount of yaw error yaw_err exceeds a threshold value yaw_errt. If yaw_err exceeds yaw_errt the VCU 10 continues at step S109, otherwise the VCU 10 continues at step S101. At step S109 the VCU 10 may employ a look-up table to provide parameters for a closed-loop feedback arrangement that attempts to reduce the value of yaw_err below yaw_errt. The parameters are arranged to cause the value of MTV to increase at a relatively fast or relatively slow rate in dependence at least in part on the selected control mode and vehicle speed. The VCU 10 then continues at step S101.

It is to be understood that the relative amounts of torque applied at each trailing wheel may be determined in dependence on one or more of a number of parameters including selected control mode, vehicle speed, trailing axle slip angle, side-slope angle, a measured value of drag force to which the vehicle is subject, and one or more other parameters in addition or instead. For example in the sand control mode the VCU 10 may be configured to establish relatively large amounts of torque difference in order to establish a relatively large value of MTV whereas in the GGS mode the value of MTV may be lower for a given value of Angle_TAS or yaw_err. The rate at which the VCU 10 causes MTV to increase and decrease may also be dependent on one or more of these parameters. For example, in the case of travel over sand the VCU 10 may cause an increase in MTV relatively quickly in order to arrest an increase in Angle_TAS. It is to be understood that when travelling over sand an increase in Angle_TAS may occur relatively quickly. In a conventional vehicle a driver is required to take relatively swift action compared with travel over dry grass, in order to prevent excessive trailing axle side-slip from becoming established. Accordingly, some embodiments of the invention increase a rate at which MTV is increased when Angle_TAS exceeds Angle_TASC or yaw_err exceeds yaw_errt. Other arrangements are also useful.

In some embodiments, one or more conditions governing intervention by one or more stability control systems (which may be implemented in the form of functions executed by the VCU 10 or other computing device) such as a dynamic stability control system (DSC), traction control system (TCS) or the like may be modified when a side-slope condition is detected. In some embodiments, one or more conditions governing intervention by a stability control system in order to correct yaw, for example to compensate for understeer or oversteer, may be modified whilst a response of a traction control system, which may compensate for wheel spin, may be unchanged. The traction control system (which may also be referred to as a traction control subsystem since it is a vehicle subsystem) may operate according to subsystem configuration parameters selected according to the control mode in which the VCU 10 is operating.

In the present embodiment, the DSC system is configured to intervene and trigger correction of excessive yaw due to lateral slip at greater threshold values of yaw error when Angle_SS exceeds Angle_SSt. The threshold values are set such that the VCU 10 will intervene to seek to reduce Angle_TAS below Angle_TASt before the DSC system intervenes.

In the present embodiment the DSC system is configured to intervene to correct yaw by brake and or/powertrain torque vectoring in dependence on control mode. In the present embodiment, if the VCU 10 is operating in the sand control mode the VCU 10 is configured to apply a brake to a wheel on one side only of the vehicle 100, at a trailing axle of the vehicle 100.

This feature has the advantage that vehicle composure may be enhanced because a specific control methodology is employed to compensate for yaw error when a side-slope condition exists rather than relying on a stability control system optimized for travel over relatively level ground. Embodiments of the present invention enable a substantial enhancement in vehicle composure when negotiating side-slopes and enhance driver confidence in vehicle handling as well as occupant comfort.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A control-system for a motor vehicle comprising:
  a module configured to detect a side-slope condition in which said vehicle is traversing a side-slope;

a module configured to detect a trailing axle slip angle (Angle_TAS) exceeding a threshold value (Angle_TASt); and a controller configured to control an amount of torque applied to one or more wheels to induce a turning moment on said vehicle, the controller being configured to, in response to the module detecting said side slope, automatically cause a first turning moment to be induced in a direction opposing side-slip of a trailing axle in a down-slope direction relative to a leading axle; and the controller being configured to, in response to detecting said trailing axle slip angle (Angle_TAS) exceeding said threshold value (Angle_TASt), cause a second turning moment to be induced in a direction to reduce the trailing axle slip angle.

2. The control-system according to claim 1 configured to determine that a side-slope condition exists when a side-slope angle exceeds a prescribed angle.

3. The control-system according to claim 1 configured to cause the second turning moment to be induced having a magnitude determined in dependence on the value of Angle_TAS.

4. The control-system according to claim 1 configured to cause the second turning moment to be induced to reduce a value of trailing axle slip angle by causing application of brake torque and/or powertrain drive torque.

5. The control-system according to claim 4 configured to cause the second turning moment to be induced at least in part by application of brake torque to a trailing up-slope wheel.

6. The control-system according to claim 4 configured to cause the second turning moment to be induced by causing an amount of powertrain drive torque delivered to a trailing up-slope wheel to exceed that delivered to trailing down-slope wheel.

7. The control-system according to claim 4 configured to cause the second turning moment to be induced by causing an amount of powertrain drive torque delivered to a trailing down-slope wheel to exceed that delivered to a trailing up-slope wheel.

8. The control-system according to claim 1 configured to cause adjustment of a suspension system to create a difference in ride-height on an up-slope side of the vehicle relative to a down-slope side of the vehicle.

9. The control system according to claim 1 configured to cause adjustment of a vehicle body roll control system arranged to provide body roll correction to reduce vehicle body roll, the system being configured to cause the vehicle body roll control system to increase a resistance of vehicle body to roll associated with the side-slope condition.

10. The control system according to claim 1 configured to operate in a selected one of a plurality of control modes of at least one subsystem of the vehicle, the system comprising a subsystem controller for initiating control of at least one subsystem in the selected one of the plurality of subsystem control modes, each of which corresponds to one or more different driving conditions for the vehicle.

11. The control-system according to claim 10 configured to determine whether to cause the first or second turning moments by causing torque applied to an up-slope wheel to exceed that applied to a downslope wheel or by causing the torque applied to a down-slope wheel to exceed that applied to an up-slope wheel in dependence on one or more of the selected control mode, the value of trailing axle slip angle, and an amount of turning moment required.

12. The control-system according to claim 10 operable in a manual control mode selection condition in which a user may select a required system control mode by means of user-operable mode selection input means.

13. The control system according to claim 10 operable in an automatic mode selection condition in which the system is configured to select automatically an appropriate system control mode.

14. The control system according to claim 13 where the system comprises evaluation means for evaluating one or more driving condition indicators to determine the extent to which each of the subsystem control modes is appropriate, the system being configured in the automatic mode selection condition automatically to control the subsystem controller to initiate control of one or more subsystems in the subsystem control mode which is most appropriate.

15. The control system according to claim 10 wherein the control modes are control modes of at least one vehicle subsystem selected from amongst an engine management system, a transmission system, a steering system, a brakes system and a suspension system.

16. The control system according to claim 15 wherein the control modes are control modes of at least two vehicle subsystems selected from amongst an engine management system, a transmission system, a steering system, a brakes system and a suspension system.

17. The control system according to claim 10 wherein in each control mode the system is configured to cause each the one or more vehicle subsystems to be operated in a subsystem configuration mode appropriate to the driving condition.

18. The control system according to claim 1 further comprising a dynamic stability control system, wherein interventions by the dynamic stability control system to correct vehicle yaw to compensate for understeer or oversteer are suspended when, in response to detecting said side slope, the control system is automatically causing the first turning moment to be induced in said direction opposing side-slip of said trailing axle in said down-slope direction relative to said leading axle.

19. A vehicle comprising a system according to claim 1.

20. A vehicle according to claim 19 wherein the vehicle is adapted for off-road driving.

21. A method of controlling a vehicle comprising:
detecting a side-slope condition in which the vehicle is traversing a side-slope;
detecting a trailing axle slip angle (Angle_TAS) exceeding a threshold value (Angle_TASt); and
controlling an amount of torque applied to one or more wheels to induce a turning moment on the vehicle,
the method comprising, in response to detecting said side slope, automatically causing a first turning moment to be induced in a direction opposing side-slip of a trailing axle in a down-slope direction relative to a leading axle; and
the method comprising, in response to detecting said trailing axle slip angle (Angle_TAS) exceeding said threshold value (Angle_TASt), causing a second turning moment to be induced in a direction to reduce the trailing axle slip angle.

22. A non-transitory carrier medium having stored thereon computer readable code that, upon execution by a processor in a vehicle carries out the steps of:
detecting a side-slope condition of the vehicle traversing a side-slope;
detecting a trailing axle slip angle (Angle_TAS) exceeding a threshold value (Angle_TASt); and controlling an amount of torque applied to one or more wheels of the vehicle to, in response to detecting said side slope, automatically induce a first turning moment on the vehicle in a direction opposing side-slip of a trailing axle of the vehicle in a down-slope direction relative to a leading axle of the vehicle, and in response to detecting said trailing axle slip angle (Angle_TAS) exceeding said threshold value (Angle_TASt), causing a second turning moment to be induced in a direction to reduce the trailing axle slip angle.

* * * * *